US012792198B2

(12) United States Patent
He et al.

(10) Patent No.: US 12,792,198 B2
(45) Date of Patent: Nov. 10, 2026

(54) SIGNAL ANALYSIS INTERACTION METHOD, APPARATUS, ELECTRONIC DEVICE, AND STORAGE MEDIUM

(71) Applicant: RIGOL TECHNOLOGIES CO., LTD., Beijing (CN)

(72) Inventors: Xiaohua He, Beijing (CN); Yue Wang, Beijing (CN)

(73) Assignee: RIGOL TECHNOLOGIES CO., LTD., Beijing (CN)

( * ) Notice: Subject to any disclaimer, the term of this patent is extended or adjusted under 35 U.S.C. 154(b) by 227 days.

(21) Appl. No.: 18/932,130

(22) Filed: Oct. 30, 2024

(65) Prior Publication Data

US 2025/0077045 A1 Mar. 6, 2025

Related U.S. Application Data

(63) Continuation of application No. PCT/CN2024/070715, filed on Jan. 5, 2024.

(30) Foreign Application Priority Data

Aug. 30, 2023 (CN) ......................... 202311107749.1

(51) Int. Cl.
*G06F 3/0482* (2013.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| | | | | |
|---|---|---|---|---|
| 11,687,213 | B1 | 6/2023 | Waldo | |
| 2007/0083371 | A1* | 4/2007 | Jeong | G10L 15/142 704/256 |
| 2007/0223569 | A1 | 9/2007 | Obata | |
| 2018/0085020 | A1* | 3/2018 | Segman | A61B 5/327 |
| 2018/0296167 | A1* | 10/2018 | Stewart | A61B 5/287 |
| 2019/0200887 | A1* | 7/2019 | Shinohara | G06T 11/60 |
| 2020/0160980 | A1* | 5/2020 | Lyman | A61B 5/7264 |
| 2021/0315529 | A1* | 10/2021 | Wang | G16H 15/00 |
| 2021/0389373 | A1* | 12/2021 | Pickerd | G01R 13/029 |

(Continued)

FOREIGN PATENT DOCUMENTS

| | | | |
|---|---|---|---|
| CN | 103901244 | A | 7/2014 |
| CN | 110441572 | A | 11/2019 |

(Continued)

*Primary Examiner* — Toan H Vu
(74) *Attorney, Agent, or Firm* — Birch, Stewart, Kolasch & Birch, LLP

(57) ABSTRACT

An embodiment of the present disclosure relates to a signal analysis interaction method and a signal analysis apparatus. The method may include displaying an image of at least one waveform of an obtained signal in an image display area of a screen according to the signal; displaying a selection area in the image display area in response to a first control operation, wherein the selection area is configured to indicate an area selected by the first control operation in the image display area; determining a channel list of the signal selected by the first control operation according to an image in the selection area; and displaying a function option to be executed according to the channel list.

16 Claims, 5 Drawing Sheets

(56) References Cited

U.S. PATENT DOCUMENTS

2022/0255542 A1* 8/2022 Iwai .......................... G06F 1/04
2024/0180514 A1* 6/2024 Choi ...................... A61B 8/065

FOREIGN PATENT DOCUMENTS

CN 112181251 A 1/2021
CN 112244865 A 1/2021
CN 117149029 A 12/2023

* cited by examiner

SIGNAL ANALYSIS INTERACTION METHOD, APPARATUS, ELECTRONIC DEVICE, AND STORAGE MEDIUM

CROSS-REFERENCE TO RELATED APPLICATIONS

The present disclosure is a Continuation Application of International Application No. PCT/CN2024/070715, filed on Jan. 5, 2024, which claims priority to Chinese patent application No. 202311107749.1, filed on Aug. 30, 2023, entitled "SIGNAL ANALYSIS INTERACTION METHOD, APPARATUS, ELECTRONIC DEVICE, AND STORAGE MEDIUM", which is hereby incorporated by reference in its entirety.

TECHNICAL FIELD

The present disclosure relates to the technical field of signal analysis, and in particular, to a signal analysis interaction method, a signal analysis apparatus, an electronic device, and a computer-readable storage medium.

BACKGROUND

In the technical field of electronic measurement, electronic measurement instruments such as an oscilloscope and a spectrum analyzer have been widely used. The electronic measurement instrument can transform various electrical signals such as voltage and current that are invisible to naked eyes into visible waveform curves for display, which is convenient for people to study the change process of various electrical phenomena. During the process of displaying the waveform curve of each signal through the electronic measurement instrument, test parameters of each waveform curve need to be set through the electronic measurement instrument to detect the signal quality of the electrical signal corresponding to the waveform curve.

Currently, when a signal test is performed by using such an electronic measurement instrument, a desired operation needs to be obtained through a plurality of hierarchical menus, for example, a channel, a measurement range, and a function option, etc. are set step by step from a start menu. The operation is complicated, time-consuming, and has low efficiency.

SUMMARY

In view of this, an embodiment of the present disclosure provides a signal analysis interaction method, a signal analysis apparatus, an electronic device, and a computer-readable storage medium to solve at least one problem existing in the background.

In the first aspect, an embodiment of the present disclosure provides a signal analysis interaction method applied to a signal analysis apparatus including a screen, including:

- displaying an image of at least one waveform of an obtained signal in an image display area of the screen according to the signal;
- displaying a selection area in the image display area in response to a first control operation, wherein the selection area may be configured to indicate an area selected or drawn by the first control operation in the image display area;
- determining a channel list of the signal selected by the first control operation according to the image in the selection area; and
- displaying a function option to be executed according to the channel list.

Combining with the first aspect, in an optional implementation, the displaying a function option to be executed according to the channel list may include:

- automatically matching a corresponding function option according to the number of channels and/or a channel identification in the channel list.

Combining with the first aspect of the present disclosure, in an optional implementation, the determining a channel list of the signal selected by the first control operation according to the image in the selection area may include:

- obtaining pixel colors of the image in the selection area;
- determining the channel list according to correspondence between the pixel colors and channels of the signal.

Combining with the first aspect of the present disclosure, in an optional implementation, the obtaining pixel colors of the image in the selection area may include:

- selecting at least one column of pixels in the selection area, and determining the pixel colors of the image in the selection area according to colors of the at least one column of pixels.

Combining with the first aspect of the present disclosure, in an optional implementation, the determining a channel list of the signal selected by the first control operation according to the image in the selection area may include:

- determining a first signal range and a second signal range respectively according to a horizontal range and a vertical range of the image in the selection area;
- determining the channel list according to the first signal range and the second signal range.

Combining with the first aspect of the present disclosure, in an optional implementation, after the displaying the function option to be executed according to the channel list, the method may include:

- determining a function to be executed in response to a second control operation on the function option to be executed;
- obtaining a signal parameter selected in the selection area according to the horizontal range and/or the vertical range of the image in the selection area;
- executing the determined function to be executed according to the signal parameter;
- displaying an executed result in the image display area.

Combining with the first aspect of the present disclosure, in an optional implementation, the at least one waveform of an obtained signal may include a time domain waveform or a frequency domain waveform.

- a signal parameter corresponding to the time domain waveform may include a time range, an amplitude range, a channel identification, and/or signal data;
- a signal parameter corresponding to the frequency domain waveform may include a frequency range, a signal power, a channel identification, and/or signal data.

In a second aspect, an embodiment of the present disclosure provides a signal analysis apparatus configured to implement the steps of the signal analysis interaction method in the above first aspect.

In a third aspect, an embodiment of the present disclosure provides an electronic device, including a memory and a processor, and a computer program is stored in the memory, wherein when executing the computer program, the processor implements the steps of the signal analysis interaction method in the above first aspect.

In a fourth aspect, an embodiment of the present disclosure provides a computer-readable storage medium having a computer program stored thereon, wherein when the computer program is executed by a processor, the steps of the signal analysis interaction method in the above first aspect are performed.

In a signal analysis interaction method, an analysis apparatus, an electronic device, and a computer-readable storage medium provided in the embodiments of the present disclosure, a first control operation is obtained from a user, a selection area is displayed in the image display area, a channel list of a signal selected by the first control operation is obtained, a corresponding function option according to the channel list is further automatically matched, and the currently executable function option for the currently selected signal is adaptively displayed, so as to prompt the user. Thus, when performing the signal analysis, there is no need to determine parameters to be analyzed, such as a channel waveform, a measurement range, an analysis function, etc., by selecting a plurality of hierarchical menus in sequence. It can intuitively prompt the user with the currently executable analysis function option, which is convenient for the user to select and avoids a reminder after a wrong selection. The technical problems of complicated, time-consuming, and inefficient operations during the signal analysis can be solved, and the operational flexibility and convenience of the waveform analysis are improved, thereby improving the signal analysis efficiency.

Additional aspects and advantages of the present disclosure will be set forth in part in the following description, and in part will be obvious from the following description, or may be learned by practice of the present disclosure.

BRIEF DESCRIPTION OF DRAWINGS

The drawings described herein are used to provide a further understanding of the present disclosure and constitute a part of the present disclosure. The illustrative embodiments of the present disclosure and the description thereof are used to explain the present disclosure and do not constitute an improper limitation on the present disclosure. In the drawings.

DETAILED DESCRIPTION

To make the technical solutions and beneficial effects of the present disclosure more obvious and understandable, the technical solutions in the embodiments of the present disclosure are clearly and completely described below by enumerating specific embodiments. Obviously, the described embodiments are only part of the embodiments of the present disclosure, not all of the embodiments. Based on the embodiments in the present disclosure, all other embodiments obtained by those ordinary skilled in the art without creative work are within the scope of protection of the present disclosure.

Unless otherwise defined, technical and scientific terms used herein have the same meaning as those commonly understood by those skilled in the art to which the present disclosure belongs. The terms used in the specification of the present disclosure are only for the purpose of describing specific embodiments and are not intended to limit the present disclosure.

It can be understood that the terms "first", "second", or the like may be used in the present disclosure to describe various elements, but these elements are not limited by these terms. These terms are only used to distinguish one element from another element. For example, without departing from the scope of the present disclosure, the first resistor can be referred to as the second resistor, and similarly, the second resistor can be referred to as the first resistor. Both the first resistor and the second resistor are resistors, but they are not the same resistor. When a "first" one is described, it does not mean that there must be a "second" one. When a "second" one is discussed, it does not mean that there must be a first element, part, area, layer or portion in the present disclosure. When used herein, the singular forms "a", "an", and "said/the" may be intended to include the plural forms as well, unless the context clearly indicates otherwise. The term "a plurality of" means two or more, unless specifically defined otherwise. It should also be understood that when the term "comprise/include" is used in the specification, it specifies the presence of the feature, but does not preclude the presence or addition of one or more other features. When used herein, the term "and/or" includes any and all combinations of the associated listed items.

A signal analysis interaction method provided in the embodiment of the present disclosure can be applied to a signal analysis apparatus, wherein the signal analysis apparatus may specifically be an electronic measurement instrument, such as an oscilloscope, a spectrum analyzer, a frequency meter, or the like.

Figure 1:
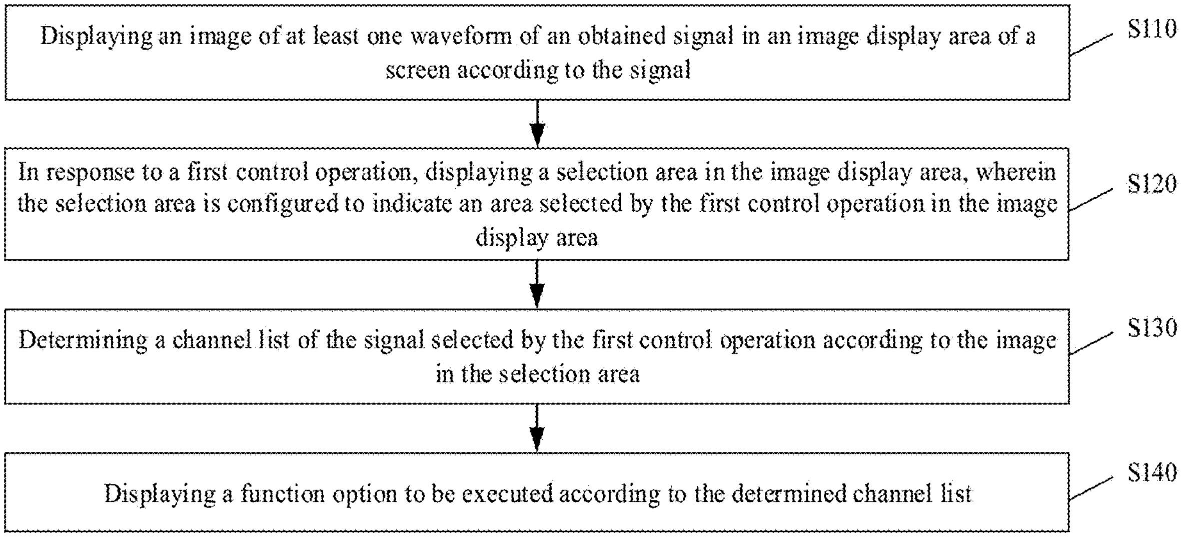
FIG. 1 is a schematic flowchart illustrating a signal analysis interaction method provided in an embodiment of the present disclosure.

Referring to FIG. 1, the signal analysis interaction method is applied to a signal analysis apparatus including a screen, and the method includes the following steps:

S110, displaying an image of at least one waveform of an obtained signal in an image display area of the screen according to the signal.

Before displaying the waveform of the signal, the signal to be analyzed may be obtained. The signal may come from one or more channels. Optionally, one signal waveform may come from one channel. Optionally, the waveform may include a time domain waveform or a frequency domain waveform.

Various types of display screens capable of displaying images may be used as an image display area. The display screen may include a CRT display screen, a liquid crystal display screen, an LED display screen, an LCD display screen, a touch display screen, etc. The image display area may include a plurality of pixel points. The image may be displayed by changing the color and brightness of the pixel points. The image may be a two-dimensional image or a three-dimensional image. Each pixel point may include a coordinate position and an attribute value of the pixel point.

For a two-dimensional image, the coordinate position includes a horizontal coordinate (abscissa) and a vertical coordinate (ordinate). For a three-dimensional image, the coordinate position is represented by three values (x, y, z), where x, y, and z are the coordinate values of the x-axis, y-axis, and z-axis, respectively, which have a common coordinate origin and are orthogonal to each other.

The physical meaning represented by the coordinate position may vary depending on the measurement device or the object being measured. Optionally, in a two-dimensional image, the coordinate position may include a horizontal coordinate and a vertical coordinate. For example, for an oscilloscope, the horizontal coordinate may represent time, and the vertical coordinate may represent the signal amplitude (V/mV), such as the amplitude of voltage or current; for a spectrum analyzer, the horizontal coordinate may represent frequency, and the vertical coordinate may represent signal power in decibels (dB). In a three-dimensional image, x may represent time or frequency, y may represent amplitude or power, and z may represent waveform number or channel number.

Color attributes of different pixel points may be used to represent different waveforms in a waveform image. Optionally, a color value may adopt different color modes such as a RGB color mode, a HSB color mode, a grayscale mode, a bitmap mode, etc. The RGB color mode may be a color composed of three primary colors: red (R), green (G), and blue (B). The HSB color mode may be a color represented by hue (H), saturation (S), and brightness (B). The grayscale mode may use different gray levels to represent brightness, such as 0~255. The bitmap mode may use black and white colors to represent pixels in the image.

Optionally, the signal data may be read from a memory, and the signal data to be processed may be stored in a storage unit in advance, or be obtained by processing the signal collected from an input port in real time. Exemplarily, the method for obtaining the signal data is as follows: firstly, a probe may be used to sample the signal to obtain an analog input signal; then, an analog signal processing unit may be used to control the analog input signal to be gained, offset, and amplified or attenuated, thereby outputting a signal with a suitable amplitude; subsequently, the signal output by the analog signal processing unit may be performed an analog-to-digital conversion, and the converted digital signal may be output; and subsequently, the digital signal may be collected and cached in the memory. The signals collected a plurality of times may be overlapped, performed data processing, such as compression, filtering, interpolation, or the like, and then stored to obtain the waveform data. Optionally, the signals of different analog signal processing units may be identified with different colors.

Figure 2:
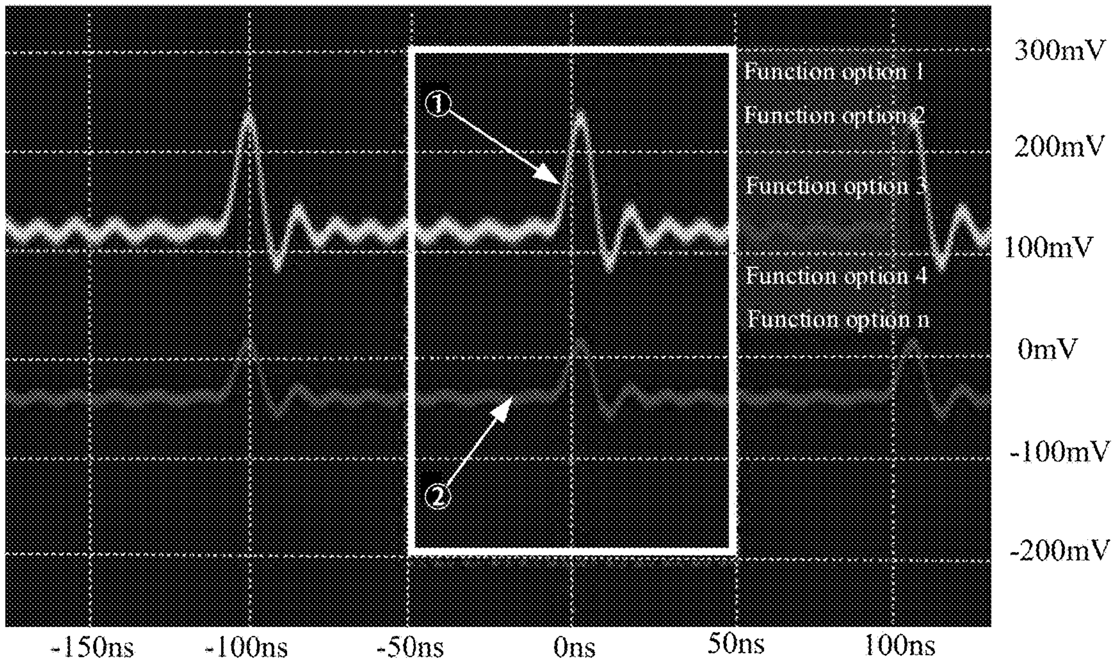
FIG. 2 is a first schematic diagram illustrating an image display area in an embodiment of the present disclosure.

The waveform image may include a waveform portion and a background portion. FIG. 2 is a first schematic diagram illustrating an image display area in an embodiment of the present disclosure, which shows a partial image display area of a display screen, wherein the horizontal axis represents time in nanoseconds (ns), and the vertical axis represents amplitude in millivolts (mV). Two waveform images ① and ② are displayed in the image display area. The color of waveform ① may be, for example, yellow, and represented by a first pixel value; the color of waveform ② may be, for example, red, and represented by a second pixel value. Background in the image display area may be black, and represented by a third pixel value.

It can be understood that the number of waveforms displayed in the image display area is not limited, and may be two as shown in FIG. 2, or may be one, three, five, etc. The type of waveform displayed is also not limited and may be a rectangular wave, a triangle wave, a sine wave, or any other type of waveform.

S120, in response to a first control operation, displaying a selection area in the image display area, wherein the selection area is configured to indicate an area selected by the first control operation in the image display area.

A user may draw a selection area or select a certain area in the image display area through the first control operation. Through the first control operation, the user can select a waveform desired to be analyzed. The implementation of the first control operation may include a keyboard, a mouse, a microphone, a gesture recognition device, a touch display screen or a touchpad, etc., which is not limited in the present disclosure.

The selection area may be used to identify the area drawn or defined by the user. The area may include an image of the waveform of the signal desired to be analyzed, such as a waveform image of a certain channel or several channels. The selection area may be a closed area or a non-closed area. An identification of the selection area may be a regular shape, such as a rectangle, a circle, an ellipse, etc., or may be an irregular shape, such as a hand-drawn circle, or a shape of a certain area enclosed by a plurality of line segments or arcs. By displaying the selection area in the image display area, it is convenient for the user to determine whether the current selection area is the desired selection area in a manner of What You See Is What You Get. The selection area may be one, two or more. Thus, the user can intuitively and flexibly select the waveform to be analyzed.

Optionally, the selection area may be obtained by changing an icon position of the image display area. The icon may be used to track in real time a change of a contact position when the image display area is contacted, or a position of a pixel point selected in the image display area. Optionally, when the image display area is contacted by a finger or a stylus to draw the selection area, the icon may track the position of the finger or stylus on the image display area and change with the change of position, such as form a movement trajectory. Alternatively, when the pixel point is selected by the mouse in the image display area and a cursor of the mouse is moved, the icon may display the position change of the selected pixel point. The icon can be a pattern such as an arrow, a circle, a cross, etc. with a certain color.

It can be understood that when the mouse cursor moves in the image display area, or a finger or stylus contacts the image display area and moves in the image display area, the icon will change into a line as the mouse cursor, finger or stylus moves, so as to track the position change or movement trajectory thereof, thereby forming the identification of the selection area.

Optionally, a method for drawing the selection area may be as follows: selecting two pixel points in the image display area; displaying positions of the two pixel points by icons; using coordinate values of the two pixel points as diagonal vertices of a rectangle, where four sides of the rectangle may be parallel to the horizontal coordinate and the vertical coordinate; determining the rectangle as first instruction information, and determining an area defined by the rectangle as the selection area. As shown in FIG. 2, a white solid line box is the drawn first instruction information, and an area defined by the white solid line box is the selection area. Alternatively, a plurality of pixel points may be selected in the image display area, the selected pixel points may be connected in sequence, and an area enclosed by the sequentially connected pixel points may be determined as the selection area. An image range of the selection area may be determined by obtaining coordinates of the pixel points identified in the selection area.

The selection of the pixel points may be achieved by operating an input device such as a mouse, a touch screen, or a touchpad, etc. Optionally, the operation method may be as follows: clicking the mouse button a plurality of times, or clicking the touch screen or the touchpad, and a position of the icon in the image display area at each click may be the position of the selected pixel point. Alternatively, firstly press the mouse button, or press the touch screen or the touchpad with a finger or a stylus, then drag the mouse, the finger, or the stylus in a predetermined trajectory, and positions where the icon passes are positions of the selected pixel points. Alternatively, firstly press the mouse button, or press the touch screen or the touchpad with a finger or a stylus, then drag the mouse, the finger, or the stylus in a predetermined trajectory, then release the button, the finger, or the stylus, and positions of the icon when the mouse button is pressed and released may be positions of the selected pixel points.

Through the above visual operation method, the waveform to be analyzed can be selected flexibly and conveniently, thereby simplifying the operation of the signal analysis instrument and improving the efficiency of signal analysis.

S130, determining a channel list of the signal selected by the first control operation according to the image in the selection area.

The selection area drawn or defined by the user in the image display area through the first control operation may include an image of the waveform of the signal desired to be analyzed. According to the image of the waveform in the selection area, the channel list of the signal selected by the first control operation may be determined. Optionally, the channel list may include information such as the number of channels and/or channel identifications. Optionally, the channel list may be determined by counting color values of the image pixels in the selection area. Each channel may correspond to a different color, so that the image of the waveform can be displayed differently. Therefore, by determining the pixel color values of the image in the selection area, the number of channels, channel identifications, and other information can be determined. Specifically, the following steps may be included:

S1311, obtaining the pixel colors of the image in the selection area. The image data in the selection area may include the horizontal coordinate, the vertical coordinate, and the pixel color value of each pixel point in the selection area. Since each channel may correspond to a different color value, the number and identifications of the channels may be determined according to the color values. In FIG. 2, the horizontal coordinate range of the selection area defined by the white solid line box is [−50 ns, 50 ns], and the vertical coordinate range is [−200 mV, 300 mV]. The selection area may include three colors, yellow and red may represent waveform images ① and ②, respectively, and black may represent the background. Three codes #FFDD55, #FF3333, and #000000 may be used to represent the above three colors, respectively. The pixel color values in the selection area may be counted, and the color values of the non-background may be obtained as #FFDD55 and #FF3333.

S1313, determining the channel list according to the correspondence between pixel colors and signal channels. When the waveform data is displayed as an image, the waveform of each channel may be represented by a different pixel color value. After the pixel color values in the selection area are obtained, the channel list selected in the selection area may be determined according to the correspondence between the pixel color values and channel signals. The channel list may include information such as the number, identification, and gear position, etc. of the channels. In FIG. 2, the color values of the waveform images ① and ② may be #FFDD55 and #FF3333, respectively, the types of pixel colors in the selection area may be two, and the corresponding channel identifications may be CH1 and CH3.

Optionally, the step of counting the types of pixel colors may also include: S1312, selecting at least one column of pixels in the selection area, counting colors of the at least one column of pixels to obtain the pixel colors of the image in the selection area. The image data may be stored in a two-dimensional array, a column index of the array may correspond to the horizontal coordinate of the image, a row index of the array may correspond to the vertical coordinate of the image, and a value of the array may correspond to the pixel color value at the coordinate position. Optionally, the column where a longitudinal symmetry axis of the selection area locates may be selected to be counted. By selecting only one column in the selection area to be counted, counting operations on all pixels in the selection area may be avoided, and thus the operation speed is improved.

Figure 6:
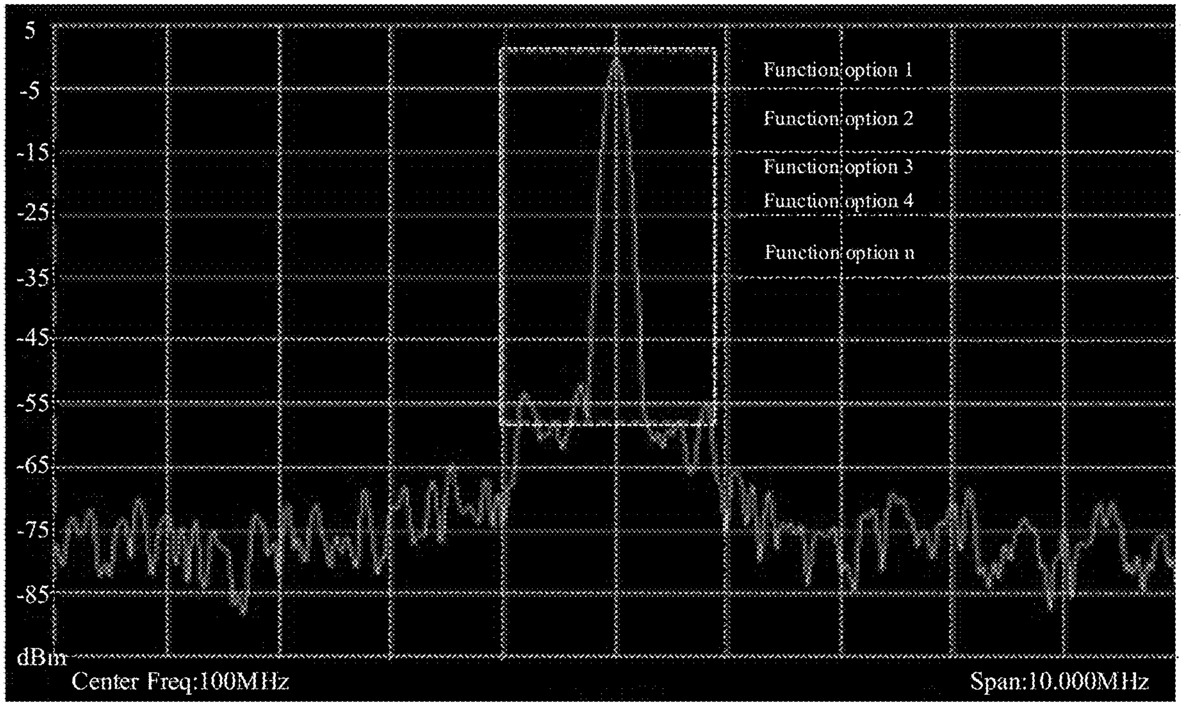
FIG. 6 is a fourth schematic diagram illustrating an image display area in an embodiment of the present disclosure.

Optionally, determining the channel list by comparing data ranges of signals may include the following steps:

S1321, determining a first signal range and a second signal range according to a horizontal range and a vertical range of the image in the selection area. The horizontal coordinate and the vertical coordinate of the waveform image may represent different physical meanings. For a time domain waveform, when the signal data is displayed, the horizontal coordinate of each pixel in the image may correspond to different time of the signal, and the vertical coordinate of each pixel may correspond to the amplitude of the signal. For a frequency domain waveform, when the signal data is displayed, the horizontal coordinate of each pixel in the image may correspond to a different frequency of the signal, and the vertical coordinate of each pixel may correspond to power of the signal. According to the horizontal range of the image in the selection area, a starting time and an ending time, or a starting frequency and an ending frequency of the selected signal to be analyzed, that is, the first signal range, may be determined. According to the vertical range of the image in the selection area, an amplitude range or a power range of the selected signal to be analyzed, that is, the second signal range, may be determined. As shown in FIG. 2, for the time domain waveform image, the selection area may be defined by the white solid line box. According to the above correspondence between the image and the waveform, the following first signal range may be obtained: time t, $-50\ \text{ns} \le t \le 50\ \text{ns}$, and the following second signal range may be obtained: amplitude a, $-200\ \text{mV} \le a \le 300\ \text{mV}$. For a frequency domain waveform image, as shown in FIG. 6, the selection area may be defined by a dotted line box, the first signal range may be about 90 MHz to 110 MHz, and the second signal range may be about 158 dBm to 2 dBm.

S1322, determining the channel list according to the first signal range and the second signal range. The time and amplitude of each channel signal data are compared from the obtained signals to determine whether the channel signal data fall within the selected data range. If yes, it indicates that the channel signal is selected. Firstly, a signal corresponding to the data in the first signal range may be found in the obtained data collected by each channel. Then, a signal channel corresponding to the data within the first signal range and the second signal range may be determined. As shown in FIG. 2, a signal data range of the selection area is as follows: time t, −50 ns≤t≤50 ns; and amplitude a, −200 mV≤a≤300 mV. By comparing the obtained signal data, it can be seen that signals of two channels CH1 and CH3 fall within the signal data range of the selection area, then it can be determined that the channels selected in the selection area are the two channels CH1 and CH3.

Figure 3:
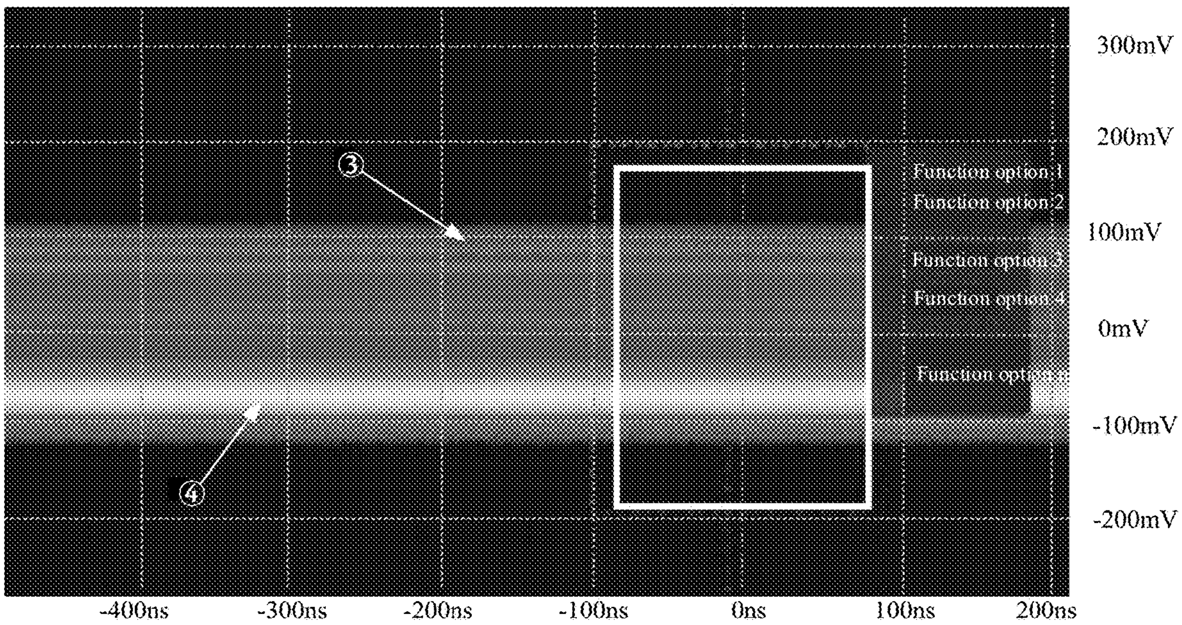
FIG. 3 is a schematic diagram illustrating waveform overlap in an embodiment of the present disclosure.

When the waveform images overlap, the channel list cannot be determined by the image pixel colors. As shown in FIG. 3, waveforms of the two channels CH1 and CH3 overlap. At this time, the channel list may be determined by comparing the channel signal data, thereby effectively solving the problem of the overlapping of the waveform images.

S140, displaying a function option to be executed according to the determined channel list. The function option may be automatically matched according to the selected channel list and vary depending on the selected channel. The function option may be provided by displaying a menu to a user through the image display area or be provided to the user in the form of a voice broadcast, which is not limited in the present disclosure.

Optionally, a method for automatically matching the function option may include: automatically matching the corresponding function option according to the number of channels and/or a channel identification in the channel list. The function option may include a single-channel function option, a dual-channel interaction function option, and/or a multi-channel interaction function option. The single-channel function may be a function that can be achieved by analyzing, measuring parameters or other processing of a single-channel signal. The dual-channel or multi-channel interaction function may be a function that can be achieved by processing the interaction between two or more channel signals. The number of channels in the channel list may be determined. If the number of channels is one, the first function option is displayed, and if the number of channels is greater than or equal to two, the second function option is displayed.

Figure 4:
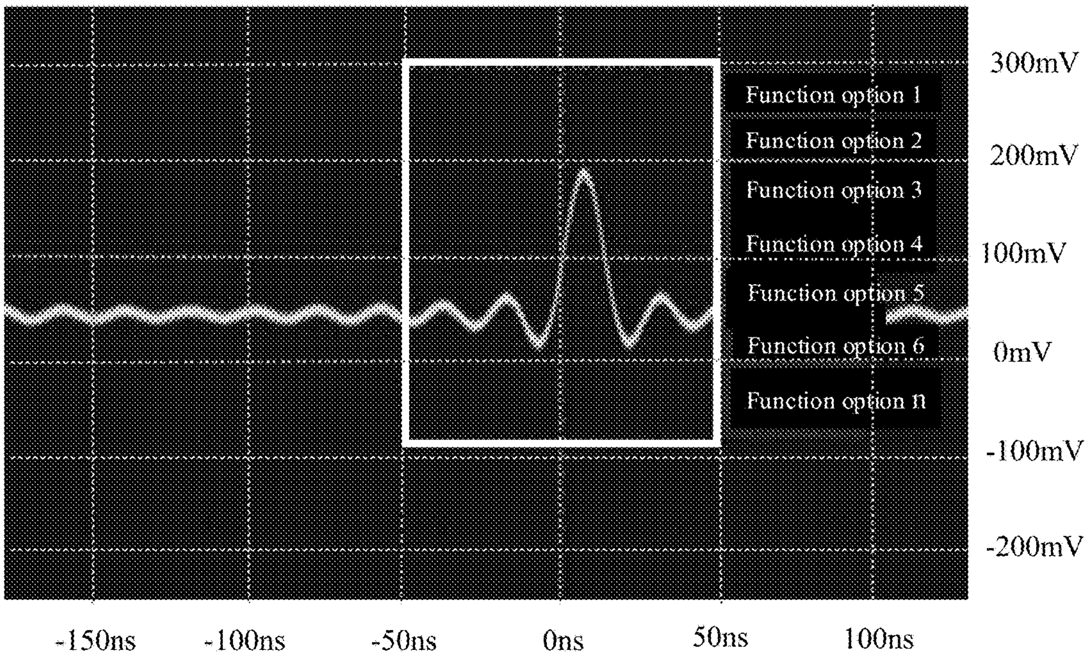
FIG. 4 is a second schematic diagram illustrating an image display area in an embodiment of the present disclosure.

If the determined channel list only includes one certain channel, a corresponding first function option (a single-channel function option) may be displayed according to the channel list. For the time domain waveform, the single-channel function option may include measurement analysis, cursor analysis, ZOOM amplification, histogram analysis, area decoding, single-channel frequency meter analysis, single-channel digital voltmeter analysis, and Fast Fourier Transform (FFT) operation analysis, etc. FIG. 4 is a second schematic diagram illustrating an image display area in an embodiment of the present disclosure, which illustrates function options of a single channel/single waveform. A rectangular box in the FIG. 4 may be an identification of the selection area drawn by the user, and a selection menu is on the right side of the rectangular box. If only one waveform of channel CH1 is selected in the selection area, only function options matching the channel are displayed in the selection menu, such as function option 1, function option 2, function option 3, function option 4, function option 5, function option 6, . . . , and function option n. Optionally, function option 1, function option 2, function option 3, function option 4, function option 5, function option 6, . . . , and function option n may respectively be CH1 area analysis FFT, CH1 full screen analysis FFT, CH1 area measurement analysis, CH1 area cursor analysis, CH1 area ZOOM, CH1 area histogram, CH1 area decoding analysis, CH1 eye diagram analysis, and CH1 jitter analysis.

The measurement analysis may be used to obtain one or more of following waveform parameters of the selected channel signal in the range of the entire image display area or the selection area: period, frequency, rise time, fall time, positive pulse width, negative pulse width, positive duty cycle, negative duty cycle, the number of positive pulses, the number of negative pulses, the number of rising edges, the number of falling edges, maximum value time, minimum value time, positive slope, negative slope, maximum amplitude value, minimum amplitude value, peak-to-peak value, top value, bottom value, average value, effective value, etc. Exemplarily, the range of the entire image display area may be: −800 ns≤t≤1400 ns.

The cursor measurement may be used to obtain following parameters of the selected channel signal and the selected waveform range: peak-to-peak value, period, frequency, time range, etc. Exemplarily, the selected waveform range may be: −500 ns≤t≤500 ns, −300 mV≤a≤200 mV.

The ZOOM amplification may be used to amplify the selected channel signal and the selected waveform range within the entire image display area or to automatically amplify the selected channel to display the waveform on the screen clearly. The histogram analysis may be used to count the number of times that the instantaneous amplitude of each sample value of the waveform occurs in order to understand the waveform structure. The histogram may be rotated, so that an amplitude scale thereof may be vertical to match the waveform, and then superimposed on the signal waveform. The area decoding may be used to translate a selected protocol message signal into a corresponding data meaning. The FFT operation analysis may be used to perform Fast Fourier Transform on the selected signal to obtain frequency domain information.

If the determined channel list contains two or more channels/waveforms, a corresponding second function option (dual-channel function option or multi-channel function option) may be displayed according to the channel list. The second function option may include the first function option, and display dual-channel interaction function option, such as Math operation, dual-channel measurement, Lissajous curve, power quality analysis, multi-channel trigger configuration or decoding configuration, etc. The dual-channel measurement may be used to obtain information of the two selected channels, such as waveform delay and phase, etc. The Math operation may be used to perform arithmetic or logical operation on the waveforms of the two selected channels. The arithmetic operation may include addition, multiplication, division, and subtraction. The logic operation may include AND, OR, and NOT operations. The Lissajous curve may be used to obtain a synthetic trajectory of two sinusoidal vibrations in mutually perpendicular directions, and to measure the frequency ratio and phase difference of the two signals. The power quality analysis may be used to analyze the power quality according to the selected channel, for example, the channel CH1 may be used as voltage and the channel CH3 may be used as current. The selected waveform range can be analyzed, and the waveform data of the entire image display area can also be analyzed. The multi-channel trigger configuration or decoding configuration may be used to configure the trigger signal. For example, when configuring IIC (I2C) protocol trigger or decoding, the channel CH1 may be used as a trigger clock and the channel CH3 may be used as data.

As shown in FIG. 2, two channels CH1 and CH3 and two waveforms ① and ② may be selected in the selection area. A rectangular box in the figure may be an identification of the selection area drawn by the user, and a selection menu may be on the right side of the rectangular box. According to the channel signal in the selection area, items that can be analyzed may be automatically matched, and each item may be listed in the function option menu on the right side of the rectangular box. For the waveforms of the selected channels CH1 and CH3, function option 1, function option 2, . . . , and function option n may respectively be: addition operation of CH1 and CH3, phase measurement of CH1 and CH3, delay measurement of CH1 and CH3, Lissajous curve analysis of CH1 and CH3, power quality of CH1 and CH3 power quality, and trigger of CH1 and CH3, etc.

Figure 7:
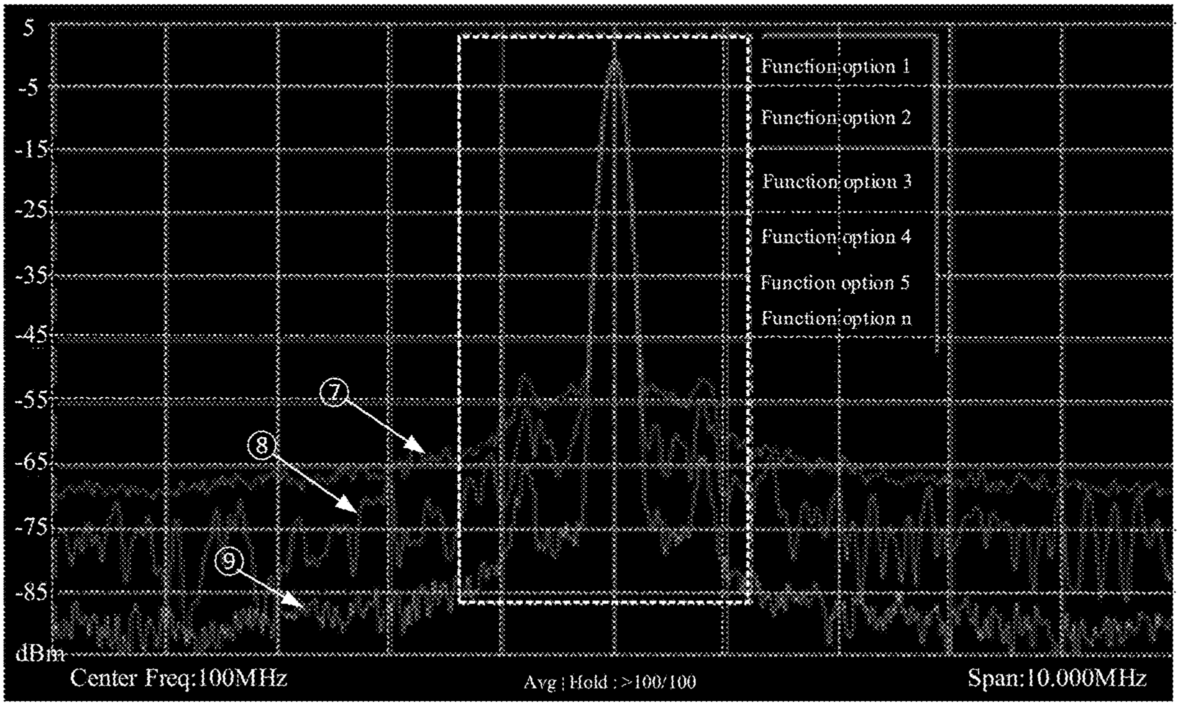
FIG. 7 is a fifth schematic diagram illustrating an image display area in an embodiment of the present disclosure.

Optionally, for the frequency domain waveform, referring to FIG. 6, function option 1, function option 2, . . . , and function option n in the first function option (single-channel function option) may include amplification, region peak, signal-to-noise ratio (SNR), bandwidth, and power measurement, etc. Referring to FIG. 7, the second function option may include the first function option, and math operation, normalization, mutual replication, etc. Optionally, the math operation may include operations such as addition, subtraction, multiplication, division, logarithm, exponentiation, etc. As shown in FIG. 7, the selection area may include three waveforms ⑦, ⑧, and ⑨, and the math operation may be, for example, an operation between two of the waveforms ⑦, ⑧, and ⑨.

After displaying the function option to be executed according to the channel list, the method may further include a step: S151, in response to a second control operation on the function option to be executed, determining the function to be executed. The second control operation may be an operation for determining, by the user, a function desired to be executed from the displayed function option to be executed. The second control operation may be implemented by using a mouse, a touch display screen, or a touchpad, or by collecting voice instructions using a microphone, which is not limited in the present disclosure. Optionally, the function option determined by the user on the selection menu may be obtained through an input device such as the mouse, the touch display screen, or the touchpad to determine the analysis function desired by the user.

S152, executing the determined function to be executed according to a signal parameter of the channel list. At least one waveform of the signal may include a time domain waveform or a frequency domain waveform. A signal parameter corresponding to the time domain waveform may include a time range, an amplitude range, a channel identification, and/or signal data. A signal parameter corresponding to the frequency domain waveform may include a frequency range, a signal power, a channel identification, and/or signal data, a bandwidth, a center frequency, etc. Each function module of the instrument may be called to execute the determined function to be executed. Different signal parameters may be selected to be transmitted according to different functions to be executed. Optionally, if the function option determined by the second control operation is an FFT operation, data and a horizontal range of the selected channel may be transmitted, for example, the horizontal range may be [−100 us, 100 us]. If the function option determined by the second control operation is cursor analysis, the data, the horizontal range, and a vertical range of the selected channel may be transmitted, for example, the horizontal range may be [−500 ns, 500 ns], and the vertical range may be [−300 mV, 200 m V]. If the function option determined by the second control operation is ZOOM amplification, the horizontal range of a display area in the screen may be transmitted, for example, [−500 ns, 500 ns].

Figure 5:
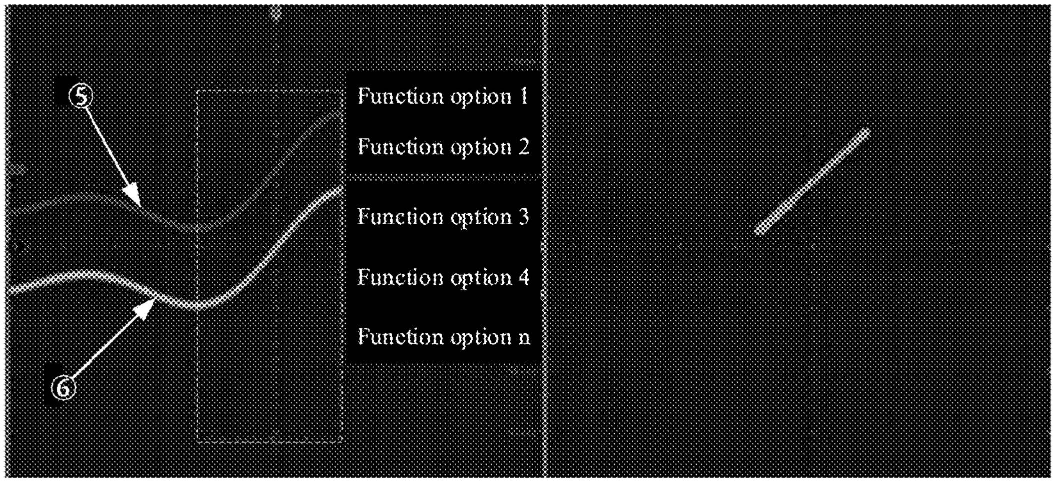
FIG. 5 is a third schematic diagram illustrating an image display area in an embodiment of the present disclosure.

Optionally, an analysis result may be displayed in the image display area. Referring to FIG. 5, the image display area may be divided into two areas, namely, a left area and a right area. The left area may be used to display the least one waveform. The right area may be used to display the analysis result of the function option. After obtaining that the user has selected the function option of CH1 and CH3 Lissajous curves, the analysis result may be displayed in the right area.

In a possible implementation, the automatic matching method for the function option may include automatically matching the function option through a user-defined method. Optionally, which function options to be displayed may be set by the user according to at least one of his or her usage preferences, usage frequency of each function, and project needs, etc. For example, if area measurement and area math operation are commonly used functions with a high usage frequency, after determining the channel signal, merely these commonly used function options may be provided to the user. For another example, if a digital voltmeter is a function required for a project in the future, this function may be set as a function option recommended to the user.

In a possible implementation, the automatic matching method for the function option may include automatically matching the function option through an automatic matching algorithm. The automatic matching algorithm may count the usage frequency of each function on a certain instrument or for a certain user, determine the function with the high usage frequency as a common function, and recommend the function option of the function to the user.

Another embodiment of the present disclosure provides a signal analysis apparatus configured to implement the above-mentioned signal analysis interaction method. Optionally, referring to FIG. 8, the signal analysis apparatus may include:

A display unit 601 configured to display at least one waveform image of an obtained signal in an image display area of a screen according to the signal. Optionally, the display unit 601 may also be configured to display an identification of a selection area, a function option, and/or a signal processing result. Optionally, the displayed signal processing result may be a processing result corresponding to the function option selected by the user, or a processing result obtained after being processed according to a recommended function option. Optionally, the processing result may be a result corresponding to a certain function option, or a result corresponding to several function options.

A selection area drawing unit 603 configured to respond to a first control operation, so that the display unit 601 displays the selection area in the image display area. The selection area drawing unit 603 may also be configured to determine a function to be executed in response to a second control operation on the function option to be executed. The selection area drawing unit 603 may include a mouse, a touch panel, or a touch screen.

A processing unit 602 configured to determine a channel list of the signal selected by the first control operation according to the image in the selection area, and display the function option to be executed according to the channel list. The processing unit 602 can also be referred to as a processor.

The processing unit 602 may be further configured to execute the function to be executed according to a signal parameter of the channel list, and display an analysis result in the image display area.

In an optional embodiment, displaying the function option to be executed according to the channel list may include:

determining the number of channels in the channel list. If the number of channels is 1, the first function option may be displayed, and if the number of channels is greater than or equal to 2, the second function option may be displayed.

In an optional embodiment, determining the channel list of the signal selected by the first control operation according to the image in the selection area may include:

obtaining pixel colors of the image in the selection area, and determining the channel list according to the correspondence between the pixel colors and channels of the signal.

In an optional embodiment, obtaining the pixel colors of the image in the selection area may include: selecting at least one column of pixels in the selection area, and determining the pixel colors of the image in the selection area according to color of the at least one column of pixels.

In an optional embodiment, determining the channel list of the signal selected by the first control operation according to the image in the selection area may include: determining a first signal range and a second signal range respectively according to a horizontal range and a vertical range of the image in the selection area, and determining the channel list according to the first signal range and the second signal range.

In an optional embodiment, after displaying the function option to be executed according to the channel list, the method may further include: determining the function option to be executed in response to the second control operation on the function option to be executed, and executing the function option to be executed according to the signal parameter of the channel list.

In an optional embodiment, at least one waveform of the signal may include a time domain waveform or a frequency domain waveform. A signal parameter corresponding to the time domain waveform may include a time range, an amplitude range, a channel identification, and/or signal data. A signal parameter corresponding to the frequency domain waveform may include a frequency range, a signal power, a channel identification, and/or signal data.

Figure 9:
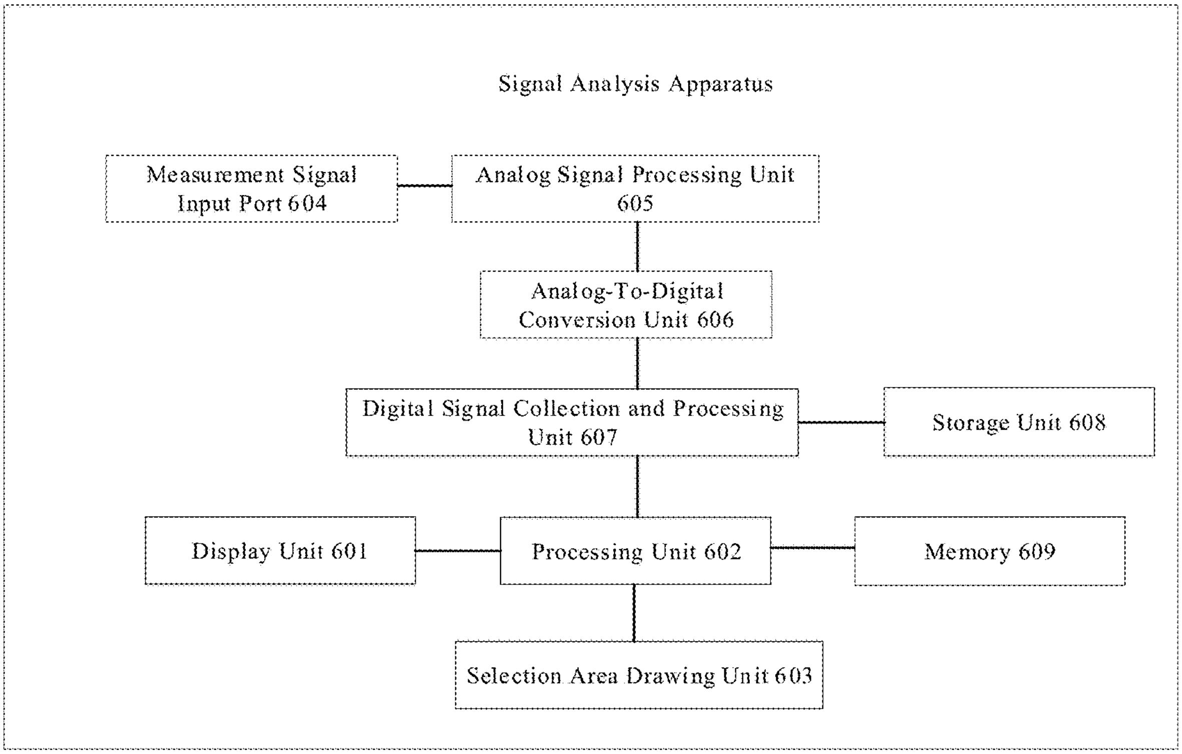
FIG. 9 is a second schematic diagram illustrating a signal analysis apparatus provided in an embodiment of the present disclosure.

Referring to FIG. 9, in an optional embodiment, the signal analysis apparatus may further include a measurement signal input port 604 configured to receive a measurement signal.

In an optional embodiment, the signal analysis apparatus may further include an analog signal processing unit 605 configured to control the gain and offset of the analog signal input, and amplify or attenuate the analog signal, thereby generating a signal with a suitable amplitude, and outputting the signal to an analog-to-digital conversion unit.

In an optional embodiment, the signal analysis apparatus may further include an analog-to-digital conversion unit 606 configured to receive the signal from an analog front end and convert the signal into a digital signal.

In an optional embodiment, the signal analysis apparatus may further include a digital signal collection and processing unit 607 configured to collect and cache the digital signal to a memory, overlap signals collected a plurality of times, and perform data processing, such as compression, filtering, or interpolation, etc., to obtain waveform data. Different analog front-end signals may be identified with different colors.

In an optional embodiment, the signal analysis apparatus may further include a storage unit 608 configured to store the waveform data output by the digital signal collection and processing unit.

In an optional embodiment, the signal analysis apparatus may further include a memory 609 configured to store an application program and cache data of a display screen.

The specific limitations of the signal analysis apparatus can refer to the limitation regarding the above-mentioned signal analysis interaction method, which is not repeated herein. Each module in the above-mentioned signal analysis interaction method may be implemented in whole or in part by software, hardware, or a combination thereof. Each of the above-mentioned modules may be embedded in or independent from a processor in a computer device in the form of hardware, or may be stored in the memory of the computer device in the form of software, so that the processor may call and execute operations corresponding to each of the above-mentioned modules.

Figure 10:
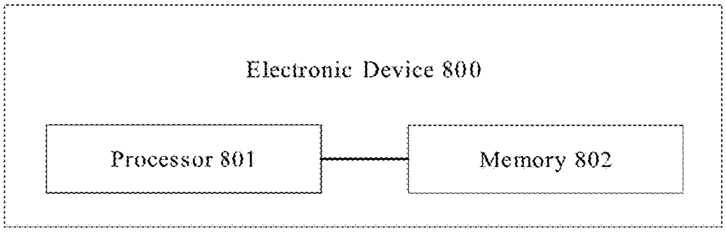
FIG. 10 is a schematic structural diagram illustrating an electronic device provided in an embodiment of the present disclosure.

An embodiment of the present disclosure also provides an electronic device. FIG. 10 is a schematic structural diagram illustrating an electronic device provided in an embodiment of the present disclosure. As shown in FIG. 10, the electronic device 800 may include one or more processors 801 and a memory 802. Computer-executable instructions may be stored in the memory 802. The processor 801 may be configured to execute the computer-executable instructions to implement the steps of the signal analysis interaction method in any of the above embodiments. The processor 801 may be a Central Processing Unit (CPU) or other forms of processing units with data processing capability and/or instruction execution capability, and may control other components in the electronic device to perform desired functions.

The memory 802 may include one or more computer program products, and the computer program product may include various forms of computer-readable storage media, such as a volatile memory and/or a non-volatile memory. The volatile memory may include, for example, a Random Access Memory (RAM) and/or a cache, etc. The non-volatile memory may include, for example, a Read-Only Memory (ROM), a hard disk, a flash memory, etc. One or more computer program instructions may be stored on the computer-readable storage media, and the processor 801 may run the program instructions to implement the steps and/or other desired functions in the signal analysis interaction method in each embodiment of the present disclosure described above.

Figure 8:
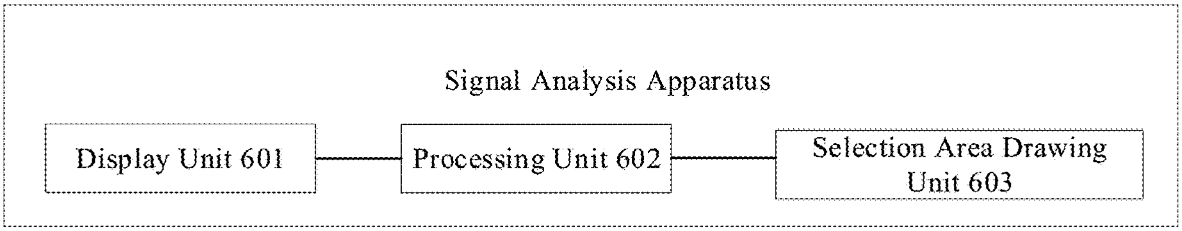
FIG. 8 is a first schematic diagram illustrating a signal analysis apparatus provided in an embodiment of the present disclosure.

In one example, the electronic device 800 may also include an input apparatus and an output apparatus, and these components may be interconnected through a bus system and/or a connection mechanism in other forms (not shown in the figure). In addition, the input apparatus may also include, for example, a keyboard, a mouse, a microphone, etc. The output apparatus may output various information to the outside, for example, it may include, for example, a display, a speaker, a printer, a communication network, and a remote output device connected thereto, etc. Certainly, for simplicity, only a part of the components related to the present disclosure in the electronic device 800 is shown in FIG. 8, and components such as a bus, an input apparatus/output interface, etc. may be omitted. In addition, according to the specific application situation, the electronic device 800 may also include any other appropriate components. In one embodiment, a computer-readable storage medium is provided, on which a computer program is stored, and when the computer program is executed by a processor, the steps of the above-mentioned signal analysis interaction method are implemented.

Those skilled in the art can understand that all or part of the processes to implement the methods in the above-mentioned embodiments may be completed by instructing a relevant hardware through a computer program, and the computer program may be stored in a non-volatile computer-readable storage medium, and when the computer program is executed, it can include the processes in the embodiment of each of the above-mentioned methods. Any reference to a memory, a storage, a database or other media used in each embodiment provided in the present disclosure may include at least one of a non-volatile memory and a volatile memory. The non-volatile memory may include a Read-Only Memory (ROM), a tape, a floppy disk, a flash memory, an optical memory, etc. The volatile memory may include a Random Access Memory (RAM) or an external cache. As an illustration and not a limitation, RAM may be in various forms, such as a Static Random Access Memory (SRAM), or a Dynamic Random Access Memory (DRAM), etc.

Various technical features of the above embodiments may be combined arbitrarily. To simplify the description, not all possible combinations of various technical features in the above-described embodiments are described. However, as long as there is no conflict in the combinations of these technical features, all should be considered to be within the scope described in the specification.

The above-described embodiments only express several implementations of the present disclosure, and the descriptions thereof are relatively specific and detailed, but they should not be understood as limiting the scope of the present disclosure. It should be noted that, for those skilled in the art, various modifications and improvements can be made without departing from the concept of the present disclosure, and these all fall within the protection scope of the present disclosure. Therefore, the protection scope of the present disclosure should be subject to the appended claims.

The invention claimed is:

1. A signal analysis interaction method, applied to a signal analysis apparatus comprising a screen, comprising:

displaying an image of at least one waveform of an obtained signal in an image display area of the screen according to the signal;

displaying a selection area in the image display area in response to a first control operation;

determining a channel list of the signal selected by the first control operation according to the image in the selection area; and displaying a function option to be executed according to the channel list.

2. The signal analysis interaction method according to claim 1, wherein the displaying a function option to be executed according to the channel list comprises:

automatically matching a corresponding function option according to the number of channels and/or a channel identification in the channel list.

3. The signal analysis interaction method according to claim 2, wherein under a condition that the corresponding function option is automatically matched according to the number of channels in the channel list, the displaying a function option to be executed according to the channel list comprises:

when the number of channels is one, displaying a first function option;

when the number of channels equal to or greater than two, displaying a second function option.

4. The signal analysis interaction method according to claim 1, wherein the displaying a function option to be executed according to the channel list comprises:

automatically matching a corresponding function option through a user-defined method.

5. The signal analysis interaction method according to claim 4, wherein the automatically matching a corresponding function option through a user-defined method comprises:

setting function options to be displayed according to at least one of usage preferences of a user, usage frequency of each function, and project needs.

6. The signal analysis interaction method according to claim 1, wherein the displaying a function option to be executed according to the channel list comprises:

automatically matching a corresponding function option through an automatic matching algorithm.

7. The signal analysis interaction method according to claim 1, wherein the determining a channel list of the signal selected by the first control operation according to the image in the selection area comprises:

obtaining pixel colors of the image in the selection area; and determining the channel list according to correspondence between the pixel colors and channels of the signal.

8. The signal analysis interaction method according to claim 6, wherein the obtaining pixel colors of the image in the selection area comprises:

selecting at least one column of pixels in the selection area and determining the pixel colors of the image in the selection area according to colors of the at least one column of pixels.

9. The signal analysis interaction method according to claim 1, wherein the determining a channel list of the signal selected by the first control operation according to the image in the selection area comprises:

determining a first signal range and a second signal range respectively according to a horizontal range and a vertical range of the image in the selection area; and determining the channel list according to the first signal range and the second signal range.

10. The signal analysis interaction method according to claim 1, wherein after the displaying a function option to be executed according to the channel list, the method comprises:

determining a function to be executed in response to a second control operation on the function option to be executed; and executing the determined function to be executed according to a signal parameter of the channel list.

11. The signal analysis interaction method according to claim 1, wherein the at least one waveform of the obtained signal comprises a time domain waveform or a frequency domain waveform;

a signal parameter corresponding to the time domain waveform comprises a time range, an amplitude range, a channel identification, and/or signal data; and a signal parameter corresponding to the frequency domain waveform comprises a frequency range, a signal power, a channel identification, and/or signal data.

12. The signal analysis interaction method according to claim 1, wherein the selection area is configured to indicate an area selected or drawn in the image display area through the first control operation.

13. The signal analysis interaction method according to claim 1, wherein the image display area comprises an area for displaying the at least one waveform and an area for displaying an analysis result of the function option.

14. A signal analysis apparatus, comprising:

a screen, wherein an image of at least one waveform of an obtained signal is displayed in an image display area of the screen according to the signal, and a selection area is displayed in the image display area in response to a first control operation; and a processor, configured to determine a channel list of the signal selected by the first control operation according to the image in the selection area, and display a function option to be executed according to the channel list.

15. An electronic device, comprising a memory and a processor, a computer program being stored in the memory, wherein the processor is configured to execute the computer program to implement a signal analysis interaction method, wherein the signal analysis interaction method comprises:

displaying an image of at least one waveform of an obtained signal in an image display area of a screen according to the signal;

displaying a selection area in the image display area in response to a first control operation;

determining a channel list of the signal selected by the first control operation according to the image in the selection area; and displaying a function option to be executed according to the channel list.

16. A computer-readable storage medium, having a computer program stored thereon, wherein when the computer program is executed by a processor, steps of the signal analysis interaction method according to claim 1 are implemented.

* * * * *